United States Patent [19]
Donelli et al.

[11] Patent Number: 5,750,006
[45] Date of Patent: May 12, 1998

[54] PROCESS FOR MAKING PAPER AND CARDBOARD

[75] Inventors: Giordano Donelli, Brescia; Massimiliano Rosellini, Leno; Raffaella Taliento, Concesio; Fausto Dore', Brescia, all of Italy

[73] Assignee: Industrie Chimiche Caffaro, S.p.A., Milan, Italy

[21] Appl. No.: 619,750

[22] PCT Filed: Sep. 27, 1994

[86] PCT No.: PCT/EP94/03225

§ 371 Date: Jun. 18, 1996

§ 102(e) Date: Jun. 18, 1996

[87] PCT Pub. No.: WO95/09817

PCT Pub. Date: Apr. 13, 1995

[30] Foreign Application Priority Data

Oct. 1, 1993 [IT] Italy .................. MI93A2094

[51] Int. Cl.⁶ .................. D21H 17/01; C02F 3/30
[52] U.S. Cl. .................. 162/181.5; 162/181.2; 162/189; 210/605; 210/610; 210/903
[58] Field of Search .................. 162/180, 181.2, 162/181.4, 181.5, 189, 190; 210/601, 605, 903, 610

[56] References Cited

U.S. PATENT DOCUMENTS

| 4,039,438 | 8/1977 | Anderson | 210/11 |
| 4,715,958 | 12/1987 | Fuchs | 210/605 |
| 5,124,039 | 6/1992 | Brautigam | 210/610 |

FOREIGN PATENT DOCUMENTS

| 3 838 864 | 5/1990 | Germany. |
| 1 107 717 | 3/1968 | United Kingdom. |

OTHER PUBLICATIONS

G. Rheinheimer et al., "Stickstoffkreislauf Im Wasser", 1988, R. Oldenbourg Verlag. pp. 118–361.
Database WPI, Week 7842, Derwent Publications Ltd., London, GB; An 78–75094A & JP, A, 53 103 654 (Yamada K.K) 9, Sep. 1978.

*Primary Examiner*—Donald E. Czaja
*Assistant Examiner*—Steven B. Leavitt
*Attorney, Agent, or Firm*—Henry D. Coleman; R. Neil Sudol

[57] ABSTRACT

Process for making paper and cardboard, wherein at least one nitrate or basic nitrate of a trivalent metal is used as sizing agent, so that the process wastewater, after a biological denitrification treatment, can be discharged into the environment without causing pollution problems and/or can be reused at least partially as fresh water, with great savings in consumption.

20 Claims, 1 Drawing Sheet

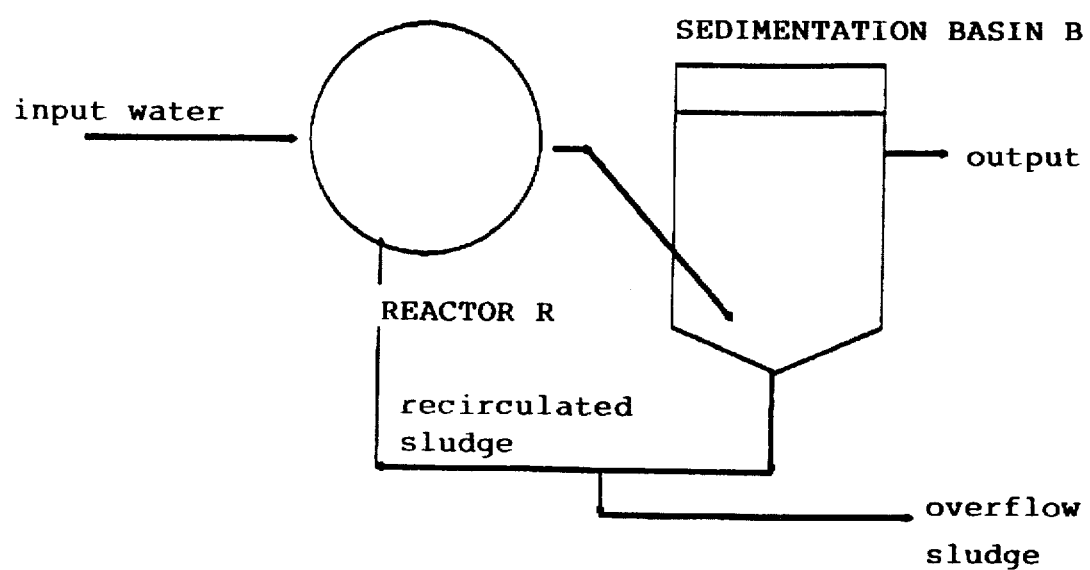
FIGURE A

PROCESS FOR MAKING PAPER AND CARDBOARD

The present invention relates to a process for making paper and cardboard, wherein at least one compound with formula (I), as specified hereinafter, is added to the aqueous disperse system of the fibers as sizing agent, and wherein the process wastewater is subjected to a biological denitrification treatment so that it can be reused.

Paper sizing processes are known in which aluminum salts, such as sulfate and particularly basic aluminum polychloride (PAC), are used as sizing agents. However, total or otherwise significant recycling of the process wastewater is practically impossible when using these inorganic sizing agents. The reason for this is that the anion of the salt used as sizing agent accumulates in the recycled water, and this can produce corrosion and/or deposits on the equipment if products containing chloride ions or sulfate ions, respectively, are used.

The Applicant has now surprisingly discovered—and this is the subject of the present invention—that if at least one compound with formula (I), as specified hereinafter, is used in paper sizing, one obtains the same advantages provided by the use of aluminum polychloride and it is also possible to eliminate all drainage and thus close the water cycle of the paper mill, minimizing water consumption simply subjecting the process wastewater to be recycled to a biological denitrification treatment.

The present invention therefore relates to a process for making paper and cardboard, wherein the aqueous dispersion of fibers and filler material, to which an addition of a cellulose-reactive rosin size has been given, receives the addition, in any stage of the process prior to the forming of the paper or cardboard sheet, of an aqueous solution of at least one compound represented by the formula (I) as sizing agent:

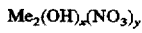
(I)

where

Me is Al, Fe(III) or Cr(III)

x is a numeral between 0 and 5 y is a numeral between 1 and 6 and x+y=6, characterized in that the process wastewater to be treated, and at least partially reused, is subjected to a biological denitrification treatment by using a denitrifying anoxic sludge which is able to denitrify in the absence of molecular oxygen, with the proviso that the wastewater to be treated, before being denitrified, contains:

(a) a carbon-containing organic substrate (C.O.D.) in an amount, with respect to the nitrogen expressed as nitric nitrogen, to meet at least the weight ratio C.O.D.:N=5:1; and (b) an amount of phosphorus to meet at least the weight ratio P:N=1:5.

Preferably, according to the invention, Me is Al in formula (I).

If nitrate or basic aluminum nitrate is used as sizing agent in the sizing of paper with conventional resin-based size, one obtains first of all a good sizing effect but also excellent retention of the fibers and conventional additives that form the mixture.

In particular, when aluminum salts are used as well, the sizes used in paper sizing are cellulose-reactive rosin sizes which can generally be of three types, i.e. saponified resinates, reinforced resinates and emulsified resinates. This list, however, is non-limitative.

In the particular case of the use of basic aluminum nitrate, it is furthermore possible to use fillers that react with the acid environment, such as calcium carbonate, since good sizing is achieved even when the pH is near to neutrality. This usually entails both a better stability of the paper in the course of time as well as a reduced forming of $CO_2$ foam originating from acid attack of the carbonates.

In the preferable case of the use of basic aluminum nitrate, the process according to the present invention is therefore characterized in that the aqueous disperse system of fibers and filler material, with the addition of a cellulose-reactive rosin size, receives the addition, in any stage of the process prior to the forming of the sheet of paper or cardboard, of an aqueous solution the concentration of which is equal to a content of 10 to 20% $Al_2O_3$, of basic aluminum nitrate which has the formula (II):

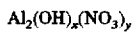
(II)

where x is a numeral between >0 and 5 y is a numeral between 1 and <6 and x+y=6.

In this particular embodiment, the amount of basic aluminum nitrate added to the fiber-containing disperse system depends on the amount of size used, in a percentage ranging from 0.4% to 3% of the product in terms of the total dry substances of the paper.

The term "anoxic sludge" designates, according to the present invention, a biological sludge which contains at least one facultative heterotrophic bacterium selected from the group consisting of Pseudomonas, Micrococcus, Archromobacter, Bacillus and Spirillum, which are able to denitrify in anoxic conditions, i.e. in the absence of atmospheric oxygen. These bacteria use the nitrate, instead of oxygen, as final electron acceptor in order to complete the enzymatic-catabolic chain that provides energy to the bacteria themselves. The waste catabolite is nitrogen instead of water and carbon dioxide as in a normal aerobic catabolism. The optimum pH for the action of these bacteria is 7.8–9, preferably in the range 8–8.5. If the pH of the water to be treated is not within this range, it is necessary to add to the water itself the amount of acid or base required to bring it to optimum levels. The temperature at which the bacteria normally act is the ambient temperature, i.e. it has seasonal maximums and minimums that depend on the location of the plant. In any case it is preferable to keep the temperature of the water to be treated within the range between +5° and +50° C., preferably between +10° and +35° C.

The amount of the compound having formula (I) used according to the present invention as sizing agent, is in the range between 0.4 and 3% of polynitrate with respect to the total dry substances present in the paper, preferably between 0.7 and 1.3% with respect to the dry content. With this amount, the content of nitrates in the water to be denitrified remains within the range between 9.3 and 184 mg/l, preferably between 16.3 and 80 mg/l, of nitrate expressed as nitric nitrogen.

The anoxic sludge required to denitrify water of this kind has a volatile suspended solid (VSS) content from 1000 to 4000 mg/l and preferably from 2500 to 3500 mg/l; this parameter gives indications as to the concentration of bacteria in the sludge. The time of contact of the water to be denitrified with the anoxic sludge varies in the range between 10 minutes and 7.3 hours, preferably between 30 minutes and 1.3 hours.

The anoxic sludge, in order to be able to denitrify, requires a certain amount of carbon-containing organic substrate, expressed as C.O.D. (chemical oxygen demand), equal to 5 times the amount of nitrate, expressed as nitric nitrogen, that is present. For the above given nitrate content ranges, the C.O.D. must be in the range between 46.5 and 920 mg/l, preferably between 81.5 and 400 mg/l of C.O.D. If the water does not contain a sufficient amount of C.O.D., it is necessary to add some of it in the form of methanol, in an amount by weight of 3/5 of the missing C.O.D. For example, in order to eliminate 30 mg/l of nitric nitrogen in a water containing 70 mg/l of C.O.D., it is necessary to calculate the missing amount of C.O.D. by performing the following calculations:

(30×5)−70=80 mg/l (amount of missing C.O.D.)

80×3/5=48 mg/l (amount of methanol to be added to the water).

Of course it is also possible to add methanol in excess: in this case the C.O.D. will not be fully used up (the reaction with methanol is kinematically preferred).

The anoxic sludge for denitrification also requires an amount of phosphorus to be used as nutrient; this amount is equal to 1 mg/l of P for every 5 mg/l of nitric nitrogen to be eliminated. For the above indicated nitrate-content ranges, the water to be biologically denitrified must contain an amount of P in the range between 2 and 37 mg/l, preferably between 3.5 and 16 mg/l of P. If the water does not contain a sufficient amount of P, it is necessary to add some in the form of a phosphate, as a soluble salt or as phosphoric acid, so that the added phosphor matches the required amount or is slightly in excess.

The compounds having formula (I) or (II) which are used as sizing agents, according to the present invention, are known compounds and/or can be obtained according to known methods, for example (by way of non-limitative indication) as described in U.S. Pat. Nos. 4,297,336, 3,415,618, 1,192,410, 2,931,706, 3,655,329, 3,497,459, 3,544,476, 3,983,221; GB Patents 2,113,666, 1,357,603, 2,053,172, FR Patent 2,278,319, or in the Japanese patent application published as no. 40-5044 and/or by means of methods described or indicated in the respective Gmelin volumes.

Preferably, the compounds having formula (I) or (II) can be obtained by reacting at temperatures in the range between 70° and 200° C. and at pressures in the range between 1 and 10 bar, in a steel vessel covered with an enamelled acid-proof or in any case acid-resistant coating, nitric acid at a concentration of 30% to 70% by weight with the oxide or hydrated oxide or hydroxide of the metal Me in an amount between the stoichiometric value and 20% excess with respect to the stoichiometric value. When the product has reached the desired degree of basicity, the reaction is interrupted by cooling and/or by dilution with cold water, and the product is filtered to separate it from the unreacted oxides or hydroxides and from any solid impurities.

The above described process can be performed continuously in a series of cascade-connected reactors or in a single tubular reactor.

The oxides, hydrated oxides and/or hydroxides preferably used to prepare the compounds having formula (I) or (II) used as sizing agents, according to the present invention, are listed hereafter:

oxides of Fe(II) or Fe(III) or mixtures thereof, which can be obtained from the process waste of lamination or drawing processes of steelworks or from the residues of catalytic reductions of nitrogen derivatives into amines;

hydrated alumina (bayerite), which can be obtained from the extraction of bauxite;

precipitated aluminum hydroxide, which can be obtained by precipitating it with alkali from aluminum salts solutions or as a residue of the anodic oxidation of aluminum;

bauxite;

trivalent chromium hydroxide or oxide.

The particle size of the crystalline hydrated oxides, hydroxides, oxides or of the minerals can vary in the range between 1 and 1000 µm.

Naturally this list is not to be considered limitative but is merely an example.

The compounds with formula (I) or (II) are more preferably obtained according to the method described hereinafter in examples 1 to 3.

EXAMPLE 1

90 kg of 42% $HNO_3$ and 24 kg of anhydrous aluminum hydroxide (bayerite) with a particle size in the range between 10 and 100 µm, with a value of $d_{50}$ equal to 40 µm, were loaded in a 100-liter glass reactor equipped with an agitator, with reflux condenser and with electric heating.

The reflux mixture was heated up to 114° C., which is the reflux temperature, for 20 hours.

After cooling to 80° C. and filtration, the solution of the basic aluminum hydrate had a 12.5% content of $Al_2O_3$ and a 25% basicity, which corresponds to the formula:

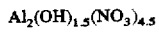
$$Al_2(OH)_{1.5}(NO_3)_{4.5}$$

The excess of unreacted alumina at the end of the reaction was equal to 13.4% of the loaded alumina.

EXAMPLE 2

80.750 kg of 46.8% $HNO_3$ and 18.5 kg of anhydrous aluminum hydroxide with a particle size in the range between 10 and 100 µm and an average value of $d_{50}$ equal to 40 µm, were loaded in the reactor as described in example 1.

The mixture was heated to 115° C. without reflux for 7 hours.

Analysis of a sample of basic aluminum nitrate solution revealed a content of $Al_2O_3$ equal to 11.7% and a basicity of 12%, which corresponds to the formula:

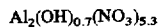
$$Al_2(OH)_{0.7}(NO_3)_{5.3}$$

18.5 kg of a 50% aqueous suspension of anhydrous aluminum hydroxide were then added to the reaction mixture.

After a further 15 hours of reflux reaction at 114° C., the reaction mixture was cooled and filtered.

Analysis of the solution of basic aluminum nitrate revealed a concentration equivalent to a 14.3% content of $Al_2O_3$ and a basicity of 38%, which corresponds to the formula:

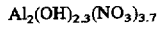
$$Al_2(OH)_{2.3}(NO_3)_{3.7}$$

The excess of unreacted alumina at the end of the reaction was 9.3% of the total loaded alumina.

EXAMPLE 3

A 200-liter autoclave made of steel lined with an acid-proof enamelled coating, equipped with an agitator and with steam-based heating, was loaded with 180 kg of 42% $HNO_3$ and with 28 kg of anhydrous aluminum hydroxide with a particle size in the range between 10 and 100 μm, with an average value of $d_{50}$ equal to 40 μm.

The reaction mixture was heated up to 150° C. and this temperature was maintained for 2 hours; the pressure reached a value of 4 bar.

After cooling and filtration, analysis of the basic aluminum nitrate solution revealed a 15% concentration of $Al_2O_3$ and a 42% basicity, which corresponds to the formula:

$$Al_2(OH)_{2.5}(NO_3)_{3.5}$$

The excess unreacted alumina, at the end of the reaction, was 3.9% of the loaded alumina.

The following examples 4, 5 and 6 exemplify but do not limit the process for making paper and cardboard according to the invention.

EXAMPLE 4

Sizing Test

According to processes known in the art of paper-making, paper sheet-making tests were conducted using basic polyaluminum nitrate, prepared as described in example 3, as sizing agent.

The experiment was performed at pH 6.7 and therefore in a medium in which calcium carbonate is stable, obtaining offset paper having the following characteristics:

| Unit weight: | 80 g/m² |
|---|---|
| Fiber composition: | |
| long-fiber soda cellulose | 23% |
| long-fiber bisulfite cellulose | 5% |
| short-fiber soda cellulose | 45% |
| semicellulose | 11.5% |
| wood pulp | 5.5% |
| waste | 10% |
| Filler: | |
| kaolin | 8% |
| calcium carbonate | 8% |

(the percentages are referred to the total weight of the sheet)

| Size: | |
|---|---|
| rosin size | 0.7% |
| (percentage referred to the dry substance) | |
| BASIC POLYALUMINUM NITRATE | 2% |
| (percentage referred to the dry substance) | |
| $Cobb_{30}$ sizing index: | 20 g/m² |

A second test was conducted with a pH of approximately 5.9 without using calcium carbonate, obtaining printing paper having the following characteristics:

| Unit weight: | 75 g/m² |
|---|---|
| Filler: | |
| kaolin | 10% |
| Fiber composition: | |
| cellulose (various kinds) | 63% |
| groundwood pulp | 7% |
| coating waste | 20% |
| (containing 35% $CaCO_3$) | |

| -continued | |
|---|---|
| Size: | |
| emulsified rosin size | 0.7% |
| BASIC POLYALUMINUM NITRATE: | 1.3% |
| (percentage referred to the dry substance) | |
| $Cobb_{30}$ sizing index: | 38 g/m² |

The characteristics of the papers obtained using basic polyaluminum nitrate, prepared as described in example 3, are good, demonstrating the fact that this compound is a sizing agent which is comparable with, and in some cases better than, the more common aluminum sulfate and aluminum polychloride.

EXAMPLE 5

Purifying Process Wastewater After Sizing With Basic Aluminum Polynitrate

The use of basic aluminum polynitrate in paper sizing was employed in an open-cycle paper mill, using a compound having formula (II), at a concentration of 3% with respect to the dry substance, and rosin size at 1% concentration with respect to the dry substance, obtaining paper with a $Cobb_{30}$ sizing index of 16 g/m².

A progressive increase in the level of nitrates in the solution was noted, until the value of 140 mg/l of nitric N was reached; the value then stabilized at this level. This concentration of nitrates produced no corrosion or deposit problems.

1500 liters of the wastewater leaving the paper mill were drawn to subject them to a biological denitrification treatment using a pilot. The goal was to obtain water as much as possible nitrate-free and could thus be reused in the plant as fresh water.

The pilot plant used, the diagramatic drawing of which is shown in Figure A, has the following characteristics:

| volume of reactor R: | 100 l |
|---|---|
| volume of sedimentation basin S: | 100 l |
| input water flow-rate: | 30 l/h |

Denitrifying anoxic sludge with a volatile suspended solid (VSS) concentration of 1589 mg/l was placed inside the reactor R. The time of contact between the wastewater and the sludge was 3.3 hours.

The wastewater to be treated was sent to the pilot plant, directly into the anoxic reactor, from which after contact with the denitrifying sludge it passed into the sedimentation basin S. Here the parts in suspension precipitated by gravity, and clarified water was obtained.

Analysis of the wastewater to be treated yielded the following results:

| TURBIDITY | 110 NTU |
|---|---|
| pH | 7.9 |
| SUSPENDED SOLIDS | 84 mg/l |
| nitric N | 140 mg/l |
| C.O.D. | 147 mg/l |
| P | traces |

Since the water content of phosphorus and organic substrate (analyzed as C.O.D.) was not sufficient, it was necessary to add 150 mg/l of $Na_3PO_4$ and 340 mg/l of $CH_3OH$. The plant was kept in operation for 48 hours. Samples for analysis were not taken during the first six hours, since a steady-state situation had not been reached yet and therefore analyses would not have been significant. Taking of samples at the plant output began after this period of time, obtaining the following average results:

| TURBIDITY | 20 NTU |
|---|---|
| pH | 7.7 |
| SUSPENDED SOLIDS | 12 mg/l |
| nitric N | <0.1 mg/l |
| C.O.D. | 12 mg/l |

In view of the results of this test, the hypothesis of total recycling of the wastewater in paper mills using basic aluminum polynitrate having formula (II) as sizing agent, was confirmed. Of course the water that evaporates at the dry end is replaced with fresh water.

We claim:

1. A process for denitrifying process wastewater produced from a papermaking process during which papermaking process, prior to formation of paper sheet or cardboard from solid material comprising fibers, filler material and cellulose reactive rosin, is added at least one compound represented by the formula (I):

$$Me_2(OH)_x(NO_3)_y \qquad (I)$$

where

Me is Al or Fe (III), x is a numeral between 0 and 5, y is a numeral between 1 and 6, and x+y=6, said process for denitrifying wastewater comprising subjecting said wastewater to a biological denitrification treatment by using a denitrifying anoxic sludge which is able to denitrify in the absence of molecular oxygen, said denitrification treatment being performed at a pH value in the range between 8 and 8.5, said wastewater, before said denitrification containing:

(a) a carbon-containing organic substrate expressed as C.O.D. (Chemical Oxygen Demand) in an amount, with respect to the nitrogen expressed as nitric nitrogen, to meet at least the weight ratio C.O.D.: N=5:1; and (b) an amount of phosphorus to meet at least the weight ratio P:N=1:5.

2. Process according to claim 1, characterized in that Me in formula (I) is Al.

3. Process according to claim 1, characterized in that the anoxic sludge contains at least one facultative heterotrophic bacterium selected from the group consisting of Pseudomonas, Micrococcus, Archromobacter, Bacillus and Spirillum.

4. Process according to claim 1, characterized in that an anoxic sludge with a volatile suspended solid (VSS) content in the range between 1000 and 4000 mg/l is used.

5. Process according to claim 4, characterized in that the anoxic sludge has a volatile suspended solid content in the range between 2500 and 3500 mg/l.

6. Process according to claim 1, characterized in that the time of contact between the water to be denitrified and the anoxic sludge is in the range between 10 minutes and 7.3 hours.

7. Process according to claim 6, characterized in that said contact time is between 30 minutes and 1.3 hours.

8. Process according to claim 1, characterized in that the amount of compound having the formula (I) is used in the range between 0.3 and 4% with respect to the solid material.

9. Process according to claim 8, characterized in that the amount of compound having the formula (II) is in the range between 0.7 and 1.3% with respect to the solid material.

10. Process according to claim 1, characterized in that the content of nitrates in the process wastewater to be subjected to the biological denitrification treatment is in the range between 9.3 and 184 mg/l.

11. Process according to claim 10, characterized in that said nitrate content is in the range between 16.3 and 80 mg/l.

12. Process according to claim 10, characterized in that the amount of C.O.D. (Chemical oxygen Demand) in the process wastewater to be subjected to the biological denitrification treatment is in the range between 46.5 and 920 mg/l.

13. Process according to claim 12, characterized in that the amount of C.O.D. (Chemical Oxygen Demand) is in the range between 81.5 and 400 mg/l.

14. Process according to claim 1, characterized in that the necessary C.O.D. (Chemical oxygen Demand) content is reached by adding methanol in an amount equal to 3/5 of the missing amount of C.O.D.

15. The process according to claim 1 wherein said wastewater is produced in a process for making paper sheet.

16. The process according to claim 1, wherein an amount of a carbon-containing organic substrate expressed as C.O.D. (Chemical Oxygen Demand) is added to the wastewater to reach at least the necessary C.O.D. content before subjecting said wastewater to said denitrification.

17. A process for denitrifying process wastewater produced from a papermaking process during which papermaking process, prior to formation of paper sheet or cardboard from solid material comprising fibers, filler material and cellulose reactive rosin, is added at least one compound represented by the formula (II):

$$Al_2(OH)_x(NO_3)_y \qquad (II)$$

where x is a numeral between 0 and 5, y is a numeral between 1 and 6, and x+y=6, said compound being included in said aqueous solution at a concentration equal to a content of 10% to 20% $Al_2O_3$, said process for denitrifying wastewater comprising subjecting said wastewater to a biological denitrification treatment by using a denitrifying anoxic sludge which is able to denitrify in the absence of molecular oxygen, said denitrification treatment being performed at a pH value in the range between 8 and 8.5, said wastewater, before said denitrification containing:

(a) a carbon-containing organic substrate expressed as C.O.D. (Chemical Oxygen Demand) in an amount, with respect to the nitrogen expressed as nitric nitrogen, to meet at least the weight ratio C.O.D.: N=5:1; and (b) an amount of phosphorus to meet at least the weight ratio P:N=1:5.

18. Process according to claim 17, characterized in that the compound having the formula (II) is used in a percentage of 0.4 to 3% with respect to the solid material.

19. Process according to claim 18, characterized in that the compound haivng the formula (II) is sued in a percentage that varies between 0.7 and 1.3% with respect to the solid material used.

20. The process according to claim 17, wherein an amount of a carbon-containing organic substrate expressed as C.O.D. (Chemical Oxygen Demand) is added to the wastewater to reach at least the necessary C.O.D. content before subjecting said wastewater to said denitrification.

* * * * *